Figure 1:
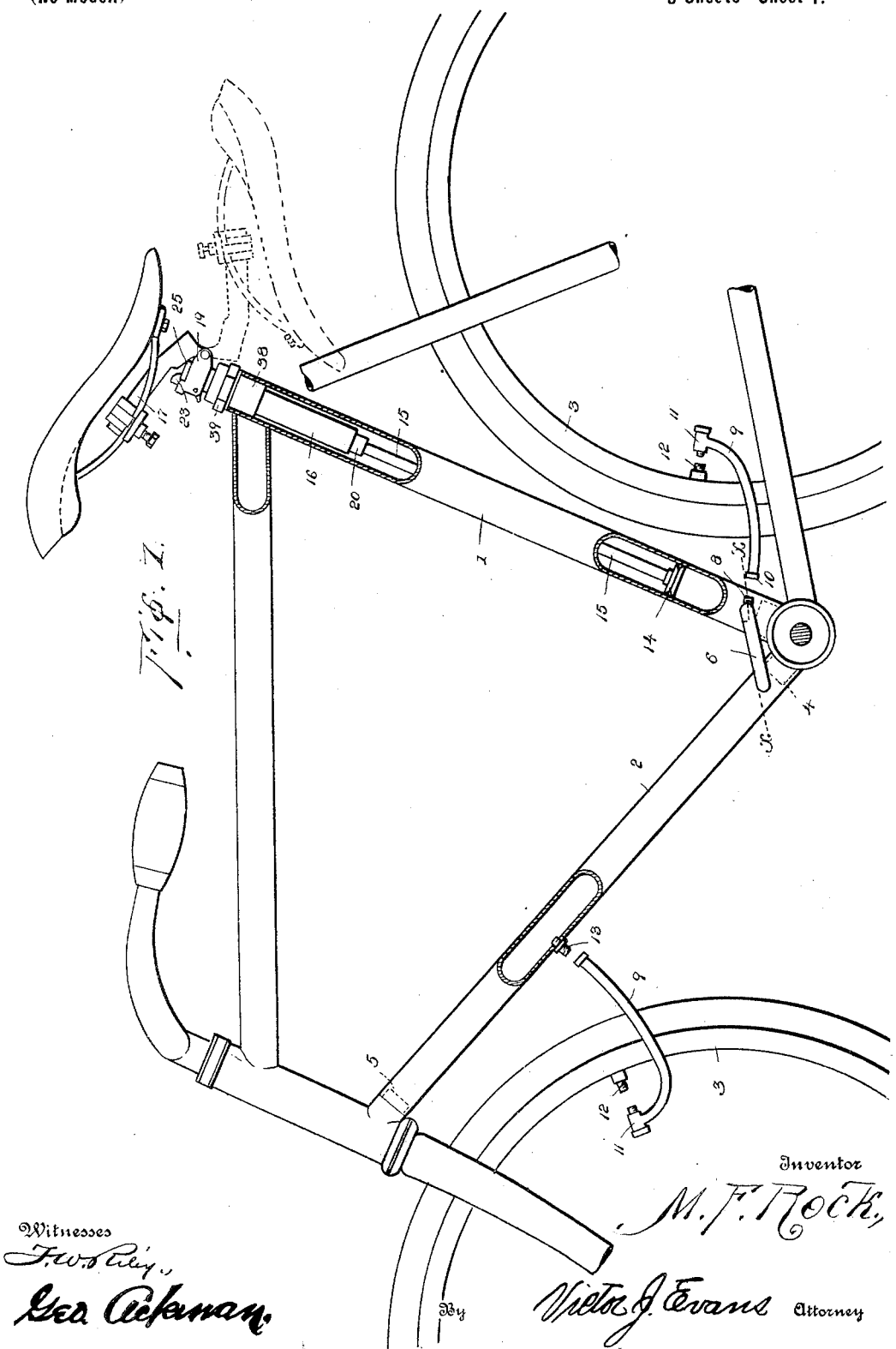

No. 679,512. Patented July 30, 1901.
M. F. ROCK.
BICYCLE PUMP.
(Application filed Jan. 12, 1901.)
(No Model.) 3 Sheets—Sheet 1.

Witnesses
F. W. Riley,
Geo. Ackman.

Inventor
M. F. Rock,
By Victor J. Evans Attorney

No. 679,512. Patented July 30, 1901.
M. F. ROCK.
BICYCLE PUMP.
(Application filed Jan. 12, 1901.)
(No Model.) 3 Sheets—Sheet 3.
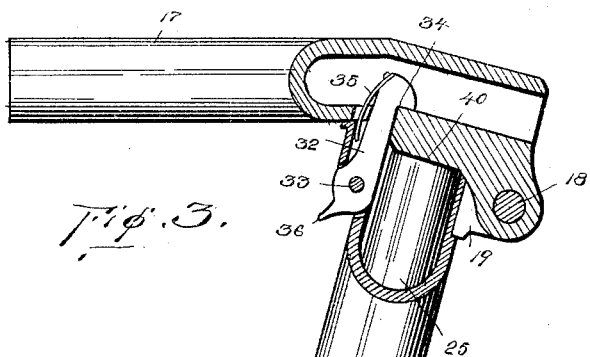
Fig. 3.
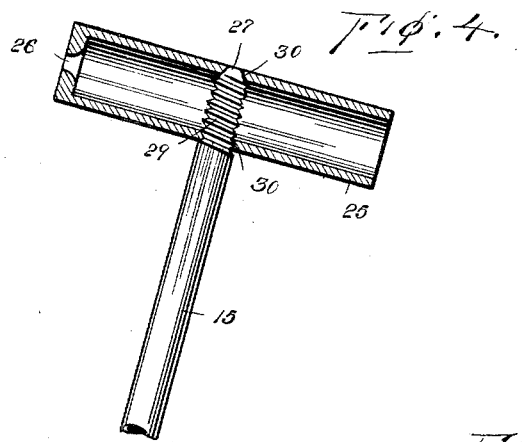
Fig. 4.
Fig. 5.
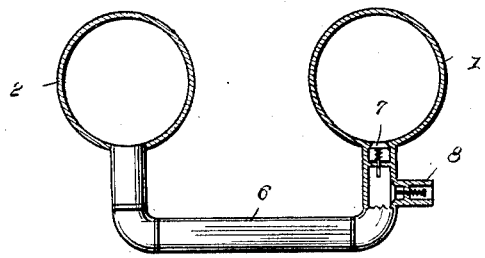
Witnesses
Inventor
M. F. Rock
By Victor J. Evans Attorney

UNITED STATES PATENT OFFICE.

MELVIN F. ROCK, OF HOMER, NEW YORK.

BICYCLE-PUMP.

SPECIFICATION forming part of Letters Patent No. 679,512, dated July 30, 1901.

Application filed January 12, 1901. Serial No. 43,039. (No model.)

*To all whom it may concern:*

Be it known that I, MELVIN F. ROCK, a citizen of the United States, residing at Homer, in the county of Cortland and State of New York, have invented new and useful Improvements in Bicycle-Pumps, of which the following is a specification.

This invention relates to pumps for inflating pneumatic tires on bicycles and other vehicles; and the object in view is to provide a pump which shall in effect form part of the machine, the said pump being carried by the machine-frame and for the most part housed within the seat-post tube, which in the present invention constitutes the pump-cylinder in which the pump-piston is adapted to reciprocate.

A bicycle-pump constructed in accordance with the present invention is entirely out of the way and concealed from view when not in use, is equal to any powerful foot-pump, and is easier to operate than the ordinary foot-pump by reason of the fact that the operator does not need to stoop or bend his back in operating the pump.

By means of the construction hereinafter described the slow and tedious process of inflating tires by means of the ordinary hand-pump is entirely done away with, and the pump is durable and simple in construction, always ready for use, does not take up valuable or extra space, and does not interfere with the strength of the bicycle-frame by reason of a portion of the frame being used as the pump-cylinder. The device is also extremely light in construction, adding very little to the weight of the machine, and by reason of the particular arrangement of the pump within the frame it is unnecessary to lean the bicycle or other vehicle against a support in order to inflate the tires.

Other objects and advantages of the invention will be fully pointed out in the course of the ensuing description.

The invention consists in certain novel features and details of construction and arrangement of parts, as hereinafter fully described, illustrated in the drawings, and incorporated in the claims.

Figure 2:
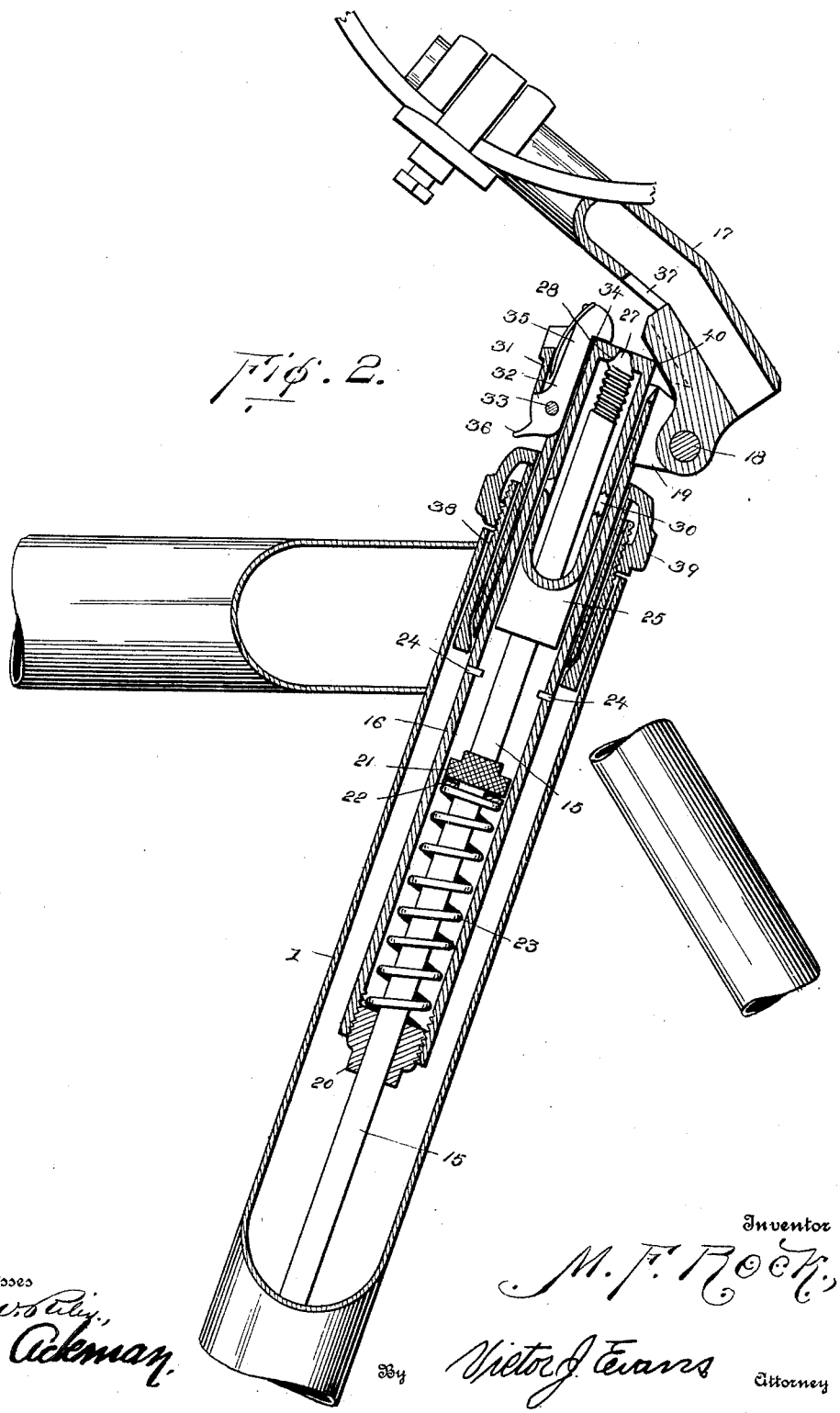

In the accompanying drawings, Figure 1 is a side elevation of a bicycle with parts thereof broken away in section to illustrate the nature of the present improvements. Fig. 2 is an enlarged vertical detail section through the upper portion of the seat-post tube, seat-post, and adjacent parts. Fig. 3 is a detail sectional view of the seat-post detached, showing the hinged upper member thereof locked in riding position. Fig. 4 is a detail sectional view of the pump-handle, showing a portion of the piston rod or plunger. Fig. 5 is a detail section on the line $x\ x$ of Fig. 1.

Similar numerals of reference designate corresponding parts in the figures of the drawings.

Referring to the drawings for the purpose of illustrating the nature of the present invention, I have shown the device applied to an ordinary safety-bicycle, in which 1 designates the seat-post tube, 2 the reach-bar or main tube, and 3 the wheels, said parts, together with the remainder of the machine, being constructed in the usual manner with the exception that in carrying out the present invention the lower end of the seat-post tube adjacent to the crank-hanger or bottom bracket is plugged, as indicated at 4, to prevent the escape of air at that point, both ends of the reach-bar or main tube 2 being similarly plugged, as shown at 5, for the same purpose.

The seat-post tube 1 constitutes the pump-cylinder, and it communicates at its lower end with the reach-bar 2 by means of a tubular connection 6, in which is placed a check-valve 7, which will allow the air compressed within the pump-cylinder or seat-post tube to pass into the tube 2 and prevent its return. The connection 7 is also provided with a threaded nipple 8 to receive a flexible connecting-tube 9, one end of which is provided with a swivel-head 10 to fit the nipple 8, while the opposite end is provided with a right-angle connection 11, adapted to be fitted to the valve-casing 12 of one of the wheel-tires in a manner that will be readily understood.

At a point adjacent to the head of the machine the reach bar or main tube 2 is provided with a nipple 13, adapted to receive the flexible connecting-tube 9, so that the latter may be attached to the valve-casing of the front-wheel tire. If desired, two of the flexible connecting-tubes 9 may be employed, so that both tires may be simultaneously inflated. These flexible connecting-tubes may be carried in the tool-bag or in any other convenient way.

14 designates the pump piston-head, which is adapted to move longitudinally within the seat-post tube 1. The piston-head 14 is mounted upon the lower end of the piston-rod or pump-stem 15, which extends upward to the upper end of the seat-post tube, so that it may be drawn outward in order to apply the handle thereto, as will hereinafter appear. The stem or rod 15 passes through the lower or upright member 16 of the seat-post, said post comprising also an upper or horizontal seat-attaching portion 17, which is pivotally connected at 18 to a laterally-extending bracket or lug 19, fast on the upper end of the lower member 16 of the seat-post.

20 designates a bushing, which is screwed into the lower end of the seat-post 16 and is provided with a central opening for the passage of the stem 15. Mounted fast upon the stem or rod 15 is a thumb or finger grip 21, the outer surface of which is milled, so that a firm hold may be taken thereon when applying the handle to the pump-stem. Beneath the grip 21 is a washer 22, which surrounds the stem, and between said washer and the bushing 20 is interposed a spiral spring 23, which encircles the stem 15, and thereby serves to thrust the stem upward, so that its upper end will project out of the upper end of the seat-post member 16. The upward movement of the washer 22 is limited by one or more inwardly-projecting pins or stop-shoulders 24. The movement of the washer is sufficient to project the pump-stem far enough above the upper end of the seat-post member 16 to allow the same to be grasped by the fingers and drawn upward until the grip 21 may be taken hold of by one hand, so as to facilitate the screwing of the handle on the stem by the other hand.

25 designates a tubular handle, which is open at one end and closed at the other, with the exception of a small central opening 26, internally smooth and adapted to receive the smooth cylindrical extremity 27 of the stem 15. When not in use, the handle 25 surrounds the stem 15 and fits within the upper end of the seat-post member 16, as clearly illustrated in Fig. 2, the extremity of the stem being sufficiently reduced to provide a shoulder 28, upon which the end of the handle rests. The end portion of the stem 15 is screw-threaded, as at 29, and the handle is provided with diametrically opposite openings 30, one of which is threaded, so that the handle may be secured upon the stem, as illustrated in the detail view, Fig. 4, the remaining opening 30 being of a size to fit the extremity 27 of the stem. In this manner the handle is fitted firmly and securely upon the stem and all looseness between the parts done away with.

The upper end of the seat-post member 16 is provided with a head or lug 31, which carries the lug 19, heretofore referred to. This lug or head is also recessed to receive a dog or latch 32, which is pivotally mounted therein at the point 33. The dog or latch embodies a catch-lip 34, and said lip is forced inward by means of a spring 35, arranged in rear of the latch and bearing against the latch and a shoulder on the lug. The latch or dog is also provided adjacent to its lower end with a thumb-piece 36, whereby said latch may be rocked outward by pressing the finger or thumb thereon. The lip of the latch is firmly held inward, so as to engage the upper horizontal seat-post member 17, said member being provided in its bottom with an opening 37, through which the point of the latch passes, as best illustrated in Fig. 3. The latch thus serves to lock the two parts of the seat-post in rigid relation to each other and prevents their accidental disengagement while the machine is being ridden. The upper end of the seat-post tube is equipped with the usual clamping-sleeve 38 and clamping collar or nut 39, so that the seat-post may be adjusted up or down and rigidly held when properly adjusted.

The seat-post member 17 is provided on its under side and adjacent to its pivot 18 with a smooth inclined surface 40, which as the member 17 is swung downward comes in contact with the upper end of the handle 25 and presses said handle and the stem 15 downward into the seat-post tube and seat-post member 16 until the upper end of the latch passes through the opening 37 and locks the said seat-post member 17 in riding position.

When the rider desires to inflate one or both tires, he dismounts from the machine and presses against the thumb-piece 36, so as to rock the latch 32 outward. This releases the seat-post member 17 and immediately the spring 23 begins to expand, forcing the stem 15 upward until it is caught by the lip 34 of the latch, the saddle and seat-post member 17 being simultaneously moved upward to the position shown in Fig. 1. The rider then thrusts the saddle rearward to the dotted-line position shown in Fig. 1. He now operates the latch again, which releases the handle 35, allowing the spring 23 to force the handle and stem upward. The rider now removes the handle 25 and draws the stem 15 upward and outward until he can grasp the finger-grip 21. By now holding said grip in one hand he can securely screw the handle 25 on the stem. After the above operation is completed one or both of the flexible connecting-tubes 9 are attached to the proper places on the frame and also associated with the valve-casings of the tires in the manner above described. By now operating the handle and piston the tires may be inflated in the usual manner. In the same manner the tires of another bicycle or vehicle may be inflated by connecting the tubes 9 therewith. After the tires are inflated the operation above described is reversed, the stem 15 being forced downward as far as it will go, the handle 25 being detached and inserted in the seat-post member 16 around the pump-stem and the saddle being rocked forward until the seat-post member 17 forces the parts inward and is caught and locked by the spring-actuated latch 32 in a manner readily understood.

I do not desire to be limited to the exact details of construction hereinabove described, but reserve the right to change, modify, or vary the construction within the scope of this invention.

I claim—

1. The combination with the seat-post tube of a bicycle; of a hollow seat-post mounted therein and comprising a pivoted upper horizontal member; a pump-piston mounted in the seat-post tube; a stem connected therewith and passing through the lower member of the seat-post; a detachable tubular handle surrounding the upper end of the stem; and a latch adapted to engage said handle and also lock the upper horizontal member of the seat-post, substantially as described.

2. The combination with the seat-post tube of a bicycle; of a pump-piston and plunger mounted therein; a saddle-post through which said stem passes; a tubular handle detachably mounted on said stem and inclosed by a saddle-post; and a latch coöperating with the handle for holding the handle and stem within the seat-post tube and the saddle-post, substantially as described.

3. The combination with the seat-post tube of a bicycle; of a hollow saddle-post mounted therein; a pump-piston mounted within the tube; a stem connected therewith and passing through the saddle-post; a bushing in the lower end of the saddle-post; a finger-grip fast on the stem; and a spiral spring encircling the stem and interposed between the finger-grip and bushing, substantially as described and for the purpose set forth.

In testimony whereof I affix my signature in presence of two witnesses.

MELVIN F. ROCK.

Witnesses:
ALBERT DILTHEY,
A. L. CHURCHILL.